United States Patent
DeCesare et al.

(10) Patent No.: US 7,359,317 B1
(45) Date of Patent: Apr. 15, 2008

(54) REDUNDANCY ARRANGEMENT FOR TELECOMMUNICATIONS SWITCH

(75) Inventors: John R. DeCesare, Sandwich, MA (US); James F. Allen, Sandwich, MA (US); Octavio P. Amaral, Bourne, MA (US)

(73) Assignee: Excel Switching Corporation, Hyannis, MA (US)

( * ) Notice: Subject to any disclaimer, the term of this patent is extended or adjusted under 35 U.S.C. 154(b) by 792 days.

(21) Appl. No.: 10/783,984

(22) Filed: Feb. 20, 2004

(51) Int. Cl.
*H04L 12/26* (2006.01)

(52) U.S. Cl. ...................... 370/219; 370/244

(58) Field of Classification Search ............ None
See application file for complete search history.

(56) References Cited

U.S. PATENT DOCUMENTS

| | | | |
|---|---|---|---|
| 5,398,161 A | 3/1995 | Roy | |
| 5,596,569 A | 1/1997 | Madonna et al. | |
| 5,623,643 A | 4/1997 | Janssen et al. | |
| 5,923,643 A * | 7/1999 | Higgins et al. | 370/218 |
| 5,970,013 A | 10/1999 | Fischer et al. | |
| 5,980,078 A * | 11/1999 | Krivoshein et al. | 700/1 |
| 6,005,841 A | 12/1999 | Kicklighter | |
| 6,011,733 A | 1/2000 | Fischer et al. | |
| 6,253,330 B1 | 6/2001 | Denkin et al. | |
| 6,528,901 B1 | 3/2003 | Canter | |
| 6,732,202 B1 * | 5/2004 | Ying | 710/62 |
| 6,854,072 B1 * | 2/2005 | Cagle et al. | 714/15 |
| 6,895,528 B2 * | 5/2005 | Cantwell et al. | 714/12 |
| 7,099,340 B2 * | 8/2006 | Liva et al. | 370/401 |
| 2003/0209654 A1 * | 11/2003 | Smith | 250/214 SW |
| 2006/0253852 A1 * | 11/2006 | Honda et al. | 717/177 |

OTHER PUBLICATIONS

U.S. Appl. No. 10/693,625, filed Oct. 24, 2003, by Timonthy Ray Locascio et al. for Media Resource Card With Programmable Caching for Converged Services Platform, all pages.

U.S. Appl. No. 10/783,961, filed Feb. 20, 2004, by John R. DeCesare et al. for Telecommunications Switch/Server, all pages.

* cited by examiner

*Primary Examiner*—Brian Nguyen
(74) *Attorney, Agent, or Firm*—Cesari and McKenna, LLP

(57) ABSTRACT

A system and method are disclosed for providing redundancy for telecommunication switches. A primary telecom switch has an active processing board and a passive I/O board for communicating with external sources, such as a control network and bearer traffic network. A redundant secondary telecom switch has an active processing board and a passive I/O board for communicating with a control network, and is connected to the I/O board of the primary switch through a redundancy connection for communicating with the bearer traffic network. According to the invention, the secondary telecom switch assumes the role of the primary telecom switch in the event that the primary processing board becomes unavailable. The secondary telecom switch then communicates with the bearer traffic network as the master switch through the redundancy connection and the I/O board of the primary switch, thus avoiding the necessity for reconnections and reconfiguration.

45 Claims, 5 Drawing Sheets

REDUNDANCY ARRANGEMENT FOR TELECOMMUNICATIONS SWITCH

BACKGROUND OF THE INVENTION

1. Field of the Invention

The present inventions relates generally to the field of telecommunications and, more specifically, to a system and method for providing redundancy in a telecommunications switch.

2. Background Information

A continuing trend of convergence between the circuit-switched public switched telephone network (PSTN) and packet-switched networks, such as Internet Protocol (IP) networks, has created demand for systems capable of interfacing with both types of networks while supporting a large number of diverse applications. Such applications include toll-free calling, wireless/wireline prepaid calling, directory assistance, voicemail, call centers, conferencing and many others. In order to support such diverse applications, it is generally necessary to provide a capability for performing DTMF tone generation/detection, voice recorded announcements and similar communications services. Such basic capability, conventionally packaged as a "card" or printed circuit board which interfaces with an industry standard bus, has been commercially available for some time from a variety of vendors including Intel Corporation and NMS Communications.

However, marketplace demands indicate that greater scalability, density, smaller packaging and greater performance/cost ratios are needed in order for telecommunication carriers and other service providers to operate profitably and to be in position to rapidly deploy new applications which represent new revenue sources. Also, due to high client standards, there are great demands placed on telecommunication carriers to maintain consistent availability despite failures that may occur within their systems or networks.

Network failures have been addressed in the past with many methods of redundancy. Having multiple connections or multiple data servers can provide for backup connections in the event a transmission line somehow becomes unavailable, or a data server fails. Usually, this level of redundancy is provided by the Internet carriers, and is outside the control of the telecom companies operating their own hardware applications, such as a converged services platform (CSP). An example of a CSP is described in commonly-owned U.S. patent application Ser. No. 10/693,625, filed on Oct. 24, 2003 by Locascio et al. for a MEDIA RESOURCES CARD WITH PROGRAMMABLE CACHING FOR CONVERGED SERVICES PLATFORM, which is presently incorporated herein by reference.

In the past, should the telecommunication hardware fail, such as for example, a telecommunications switch (telecom switch), a technician may have to physically remove the many connections found on the switch, remove the failed switch, insert a functional switch, and reconnect all the previously removed connections. This procedure could result in network downtime where live calls are lost, and could create the possibility of having the many connections incorrectly arranged, causing further downtime. A solution to these issues has been to duplicate all the connections and components on two redundant hardware systems, generating twice as many cables and connections. While this solution maintains an active system should one unit fail, replacing the failed unit still requires physically removing all the connections from the failed unit for replacement.

As a result, there is need for a redundancy system for use with telecommunication hardware that minimizes network downtime and reduces the possibility of human error, such as incorrect connections while replacing a failed unit, and also provides for a simplified method and apparatus for providing redundancy arrangements.

SUMMARY OF THE INVENTION

In brief summary, the present invention provides a system and method for providing redundancy for telecommunications switches (telecom switches). In accordance with the present invention, by providing a primary and secondary telecom switch, a redundancy can be established through novel redundancy connections and signaling techniques. More specifically, each has an active processing board containing the data processing devices of the telecom switch, and a passive Input/Output (I/O) board for transmitting and receiving data from external sources. The primary telecom switch also contains signaling ports for transmitting and receiving system-related data, a redundancy connection for communicating with the secondary telecom switch, and bearer traffic ports for transmitting and receiving client data from a bearer traffic network. The secondary telecom switch has an I/O board, however it only has a redundancy connection for communicating with the primary telecom switch, and signaling ports for the system-related data. The secondary I/O board does not have external connections for bearer traffic, but instead communicates bearer traffic through the redundancy connection to the primary I/O board, which then connects to the bearer traffic network.

In accordance with the present invention, data communicated with sources external to the telecom switches is received or transmitted by the I/O board of the primary telecom switch. The secondary telecom switch, on the other hand, may only communicate to external sources through the redundancy connection to the I/O board of the primary telecom switch. In the event that the active board of the primary telecom switch should become unavailable, the passive I/O board of the primary telecom switch still remains available. Then, the secondary telecom switch assumes control of operations, and utilizes the redundancy connection with the I/O board of the primary telecom switch to communicate with the external sources. This process effectively eliminates the need to reconfigure the many connections to the telecom switches during such a situation, and minimizes any noticeable downtime. Also, these operations are completed without the need for direction from an external device, such as a host computer to message the available telecom switch to assume mastership.

In accordance with an aspect of the invention, when either telecom switch becomes unavailable, the processing board may be removed from the unavailable telecom switch without interrupting service through the available telecom switch. When the primary processing board is removed, the system redirects control and data signals to the functioning telecom switch. Conversely, should the secondary processing board be removed, operations maintain their normal pathway through the primary telecom switch. The ability to leave the I/O boards of both telecom switches connected to the system while removing or replacing a failed processing board, in effect, creates a docking station arrangement for the processing boards, allowing the boards to be "hot swappable."

In accordance with another aspect of a preferred embodiment, each processing board and I/O board of the telecom switches has a unique identifier (ID). This ID is used to initialize each mating board for proper configuration and subsequent operation.

In accordance with another aspect of a preferred embodiment, the availability of each processing board is monitored by the other board by means of a handshake technique. The handshake passes a mastership signal directly between the primary and secondary telecom switches through the redundancy connection to respectively detect each other's availability.

In accordance with another aspect of a preferred embodiment, a periodic connection detect signal is transmitted from one processing board via the I/O board to the other processing board. If the primary processing board does not receive a signal within a pre-determined time period, it is programmed to assert mastership of further operations, because the redundant connection to the secondary processing board is no longer available. Likewise, if the secondary processing board does not receive the signal, it is programmed to release mastership, because without a redundancy connection, the secondary processing board is unable to communicate with external sources.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
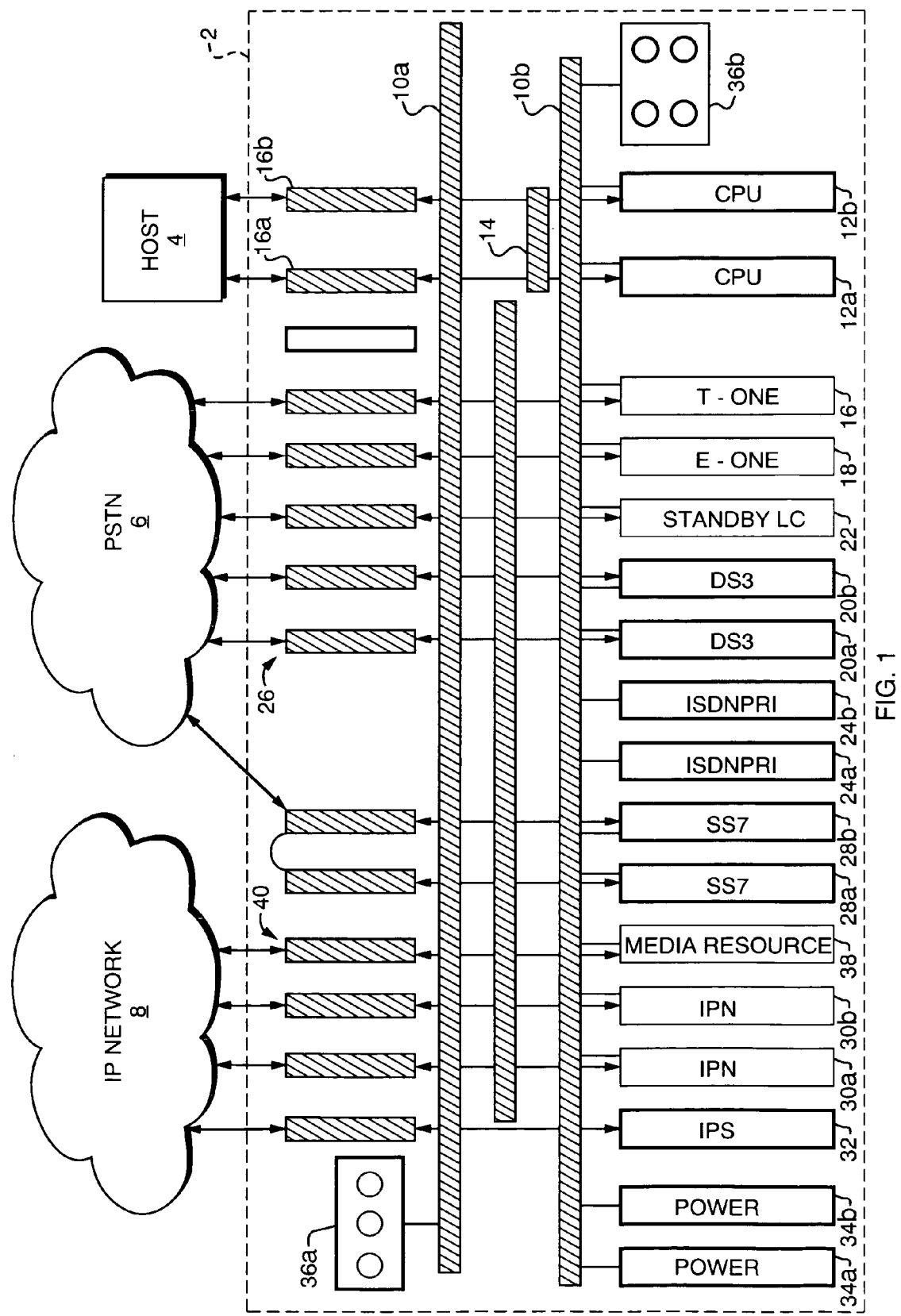
FIG. 1 is a block diagram of a converged services platform which may be used in accordance with a preferred embodiment of the present invention.

The invention described herein is readily adaptable for use with a variety of telecommunications switching systems and the scope of the invention is not limited to any particular architecture, or type of switching system. However, for purposes of illustration, one example of a telecommunications switching system with which the present invention may be employed is illustrated in FIG. 1. FIG. 1 shows a converged services platform (CSP) 2 which is controlled by an application program (not shown) running on a host computer 4. Hardware and software which may be used to implement a converged services platform of the type shown are available from Excel Switching Corporation of Hyannis, Mass. With the inclusion of appropriate cards discussed below, platform 2 is capable of interfacing with both the PSTN 6 and an IP network 8.

As shown, platform 2 includes redundant switching buses 10a and 10b. Redundant CPU cards 12a, 12b are connected to buses 10a, 10b, an HDLC bus 14, and to host 4 by way of input/output (I/O) cards 16a, 16b. Depending upon the requirements of a particular application, various combinations of the following "line" cards, each of which supports a particular digital telecommunications protocol, may be included within platform 2: T1 card 16; E1 card 18, DS3 cards 20a, 20b. For redundancy, a standby card 22, which is a duplicate of one of the other line cards, may also be included. All such line cards have an associated I/O card, denoted collectively by reference number 26, which serves as an interface to PSTN 6.

If a particular application requires ISDN signaling, ISDN PRI cards 24a, 24b may be included within platform 2. Similarly, if a particular application requires SS7 signaling, SS7 cards 28a, 28b may be included. If a particular application requires IP media transport, platform 2 may include IPN cards 30a, 30b or an IPS card 32. Also, if a particular application requires media services, a media resource card 38 may be included. Cards 30, 32 and 38 each have an associated I/O card, denoted collectively by reference number 40. Power cards 34a, 34b and cooling fans 36a, 36b are also present within platform 2.

As noted, it should be understood that the CSP as described above is an example of a telecommunications switch, which may be used with the present invention, as described below. A variety of other telecommunications switches may incorporate the embodiments of the present invention, and the scope of the invention is not limited to the particular illustration contained in FIG. 1.

Figure 2A:
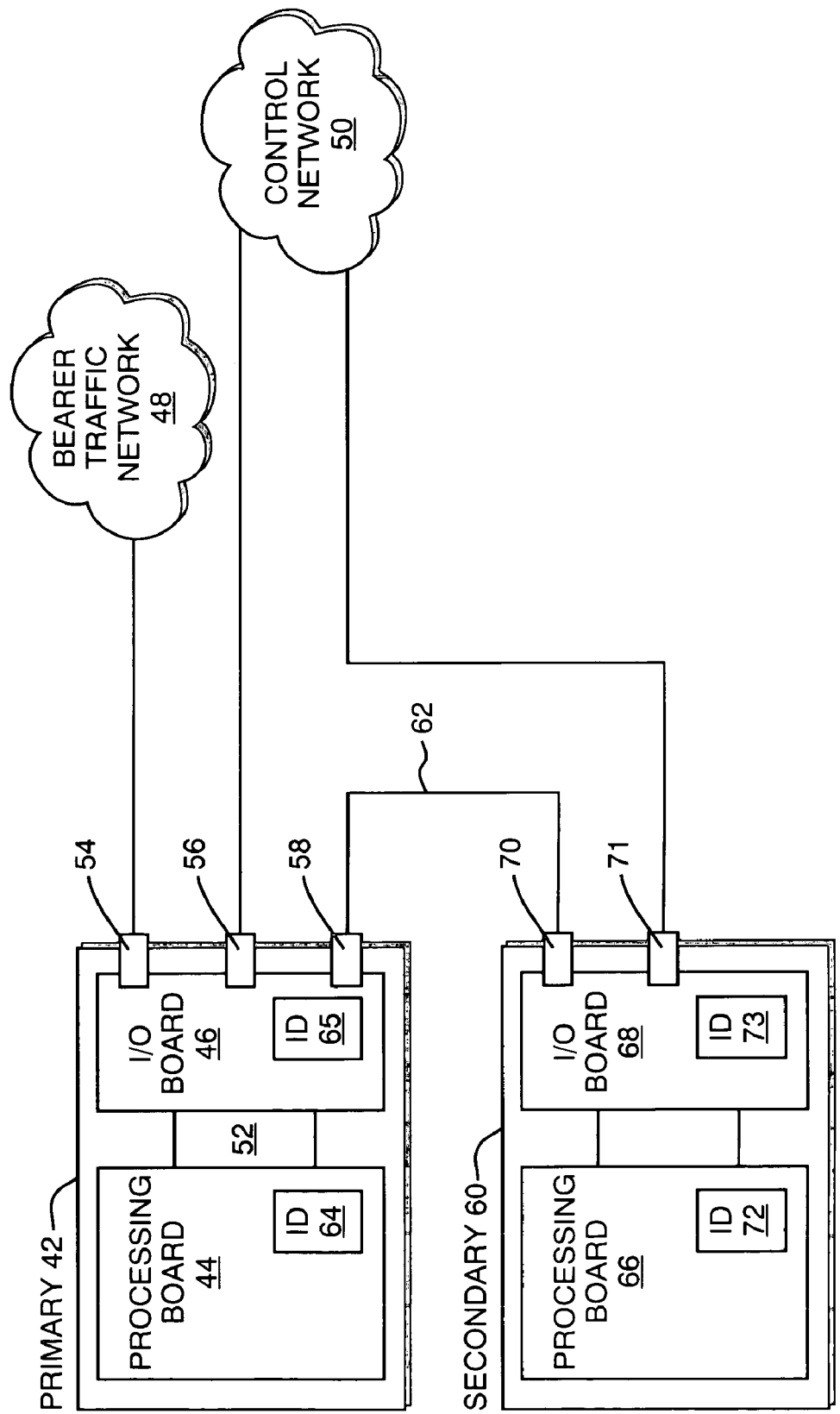
FIG. 2A is a high-level block diagram of redundancy arrangement in accordance with a preferred embodiment of the present invention.

Turning now to FIG. 2A, one embodiment of the present invention will now be described. A primary telecommunications switch (telecom switch) 42 is provided, having an active processing board 44, which contains the data processing devices of the telecom switch (not shown). A passive Input/Output (I/O) board 46 for transmitting and receiving data from external sources is connected to the processing board 44 through a connector 52. The I/O board 46 contains bearer traffic ports 54 for transmitting and receiving client data from the bearer traffic network 48, such as for example, a PSTN or an IP network, and signaling ports 56 for transmitting and receiving system-related data from the control network 50. The I/O board 46 also contains a redundancy connector 58 for communicating with a secondary telecom switch 60 over the redundancy connection 62. Each primary board 44 and 46 has a unique software identification (ID), 64 and 65, respectively, which is readable for purposes described below.

The secondary telecom switch 60 is provided and also has an active processing board 66, which contains the data processing devices of the telecom switch (not shown). In addition, the secondary telecom switch 60 has a passive I/O board 68, however, as noted it only has a redundancy connection 70 for communicating with the primary telecom switch 42 over the redundancy connection 62, and signaling ports 71 for the system-related data from the control network 50. The secondary I/O board 68 does not have external connections for bearer traffic, but instead communicates bearer traffic through the redundancy connection 62 to the primary I/O board 46, which then connects to the bearer traffic network 48. Each secondary board 66 and 68 also has a unique software-readable ID, 72 and 73, respectively.

The redundancy connection 62 may be configured as one or more cables that are preferably keyed to avoid being connected improperly (not shown). To ensure proper connection of the one or more cables of the redundancy connection 62, a connection detect signal, as described in detail below, is passed through each of the one or more cables to detect the presence of the redundancy connection 62. This is because, for example, in a preferred embodiment where two cables are used, such as one for transmitting and one for receiving, both are needed for the system to work correctly.

The bearer traffic ports 54 may be any known type of physical interface, such as T1/E1/J1 (e.g. twenty-eight RJ-45 connectors or sixteen BNC pairs), or DS3 (e.g. a single BNC pair). While it should be understood that the different types of I/O connectors may not be intermixed, the connections may be software programmable within each type to further delineate each particular connection. For example, of the twenty-eight RJ-45 connectors, a user-created configuration file may designate the first ten connections as T1, the second ten as E1, and the remaining eight as J1 connections.

It is generally preferred that the signal ports 56 and 71 maintain the same interface arrangement, for example, Ethernet, across the different interface platforms for system uniformity. Signal ports 56 and 71 may be used for a number of system control functions. Some functions may include control signals and messages from an external host computer on the control network 50, or timing signals from a specified clock source, such as a company clock or Global Positioning Satellite (GPS) clocks (not shown). The system may also be run locally on an internal clock (not shown). While any of these signals could also be communicated over the bearer traffic ports 54, it is generally preferred to use all bearer traffic ports 54 for bearer traffic only.

Figure 2B:
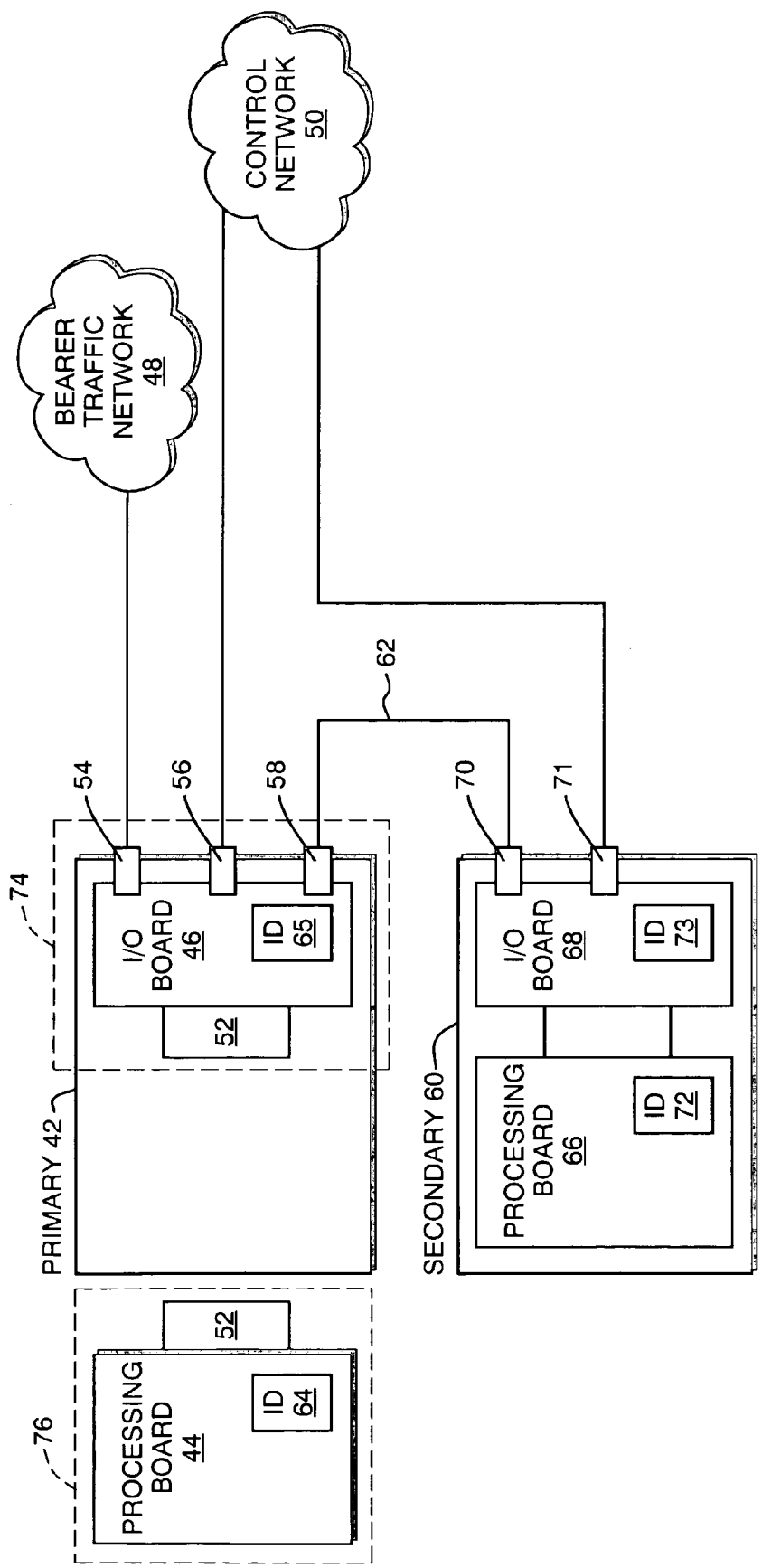
FIG. 2B is high-level block diagram of redundancy arrangement in accordance with a preferred embodiment of the present invention, showing the arrangement when the primary telecom switch processing board has been removed.

A preferred embodiment of the present invention utilizes a sliding tray and docking station design, such as that described in commonly-owned U.S. patent application Ser. No. 10/783,961, filed Feb. 20, 2004 by DeCesare for an IMPROVED TELECOMMUNICATIONS SWITCH/SERVER, which is presently incorporated herein by reference, and is represented in FIG. 2B. The docking station 74 may be physically mounted to a rack or cabinet (not shown), and contains only the passive components of the telecom switch 42, such as the passive I/O board 46, and therefore has a very low probability of failure. Because of this, the docking station 74 may be considered to be a non-field replaceable unit (FRU), and it may be permanently mounted in the cabinet. The sliding tray 76, on the other hand, contains all the active components of the telecom switch 42 such as the processing board 44, and is intended to be easily replaced as an FRU in accordance with the features of the present invention. Also, there may be no need to power down the system while changing the processing boards 44 or 66, making them "hot swappable."

In accordance with the present invention, all client data communicated with bearer traffic network 48 is received or transmitted by the I/O board 46 of the primary telecom switch 42. The secondary telecom switch 60, on the other hand, may only communicate to the bearer traffic network 48 through the redundancy connection 62 to the I/O board 46 of the primary telecom switch 42. In the event that the primary telecom switch 42 should become unavailable, the passive I/O board 46 of the primary telecom switch 42 remains available and is connected to the secondary telecom switch 60, which then substantially immediately assumes control of operations utilizing the redundancy connection 62 and the I/O board 46 of the primary telecom switch 42 to communicate with the bearer traffic network 48. This process effectively eliminates the need to reconfigure the bearer traffic ports 54, which may have many multiple connections, during such a situation, and minimizes any noticeable downtime. Furthermore, the failed switch 42 can be removed without removing any cables from the connections of port 54, which could interrupt service or lose live calls. When the processing board 44 fails or is removed, the system responds by detecting the unavailability and transferring control over operations to the functional secondary switch 60. The data is already being received by the secondary switch 60 through the I/O board 46 of the primary switch 42 and the redundancy connection 62. The transmission circuitry of the primary I/O board 46 recognizes that the processing board 44 has either failed or been removed and transmits the data from the redundancy connector 58 and to the bearer traffic ports 54. When the primary processing board 44 becomes unavailable, the secondary switch 60 recognizes that the processing board 44 is unavailable through the use of a mastership signal, as described below, and in response to this, the secondary switch 60 may then assert mastership of the system. It should be understood that if the secondary switch 60 becomes unavailable first, normal operation is continued on the primary switch 42.

Using hardware configured as stated above, a typical software initialization of a processing board, such as 44 for this example, in accordance with a preferred embodiment of the present invention will now be described. Because the processing board 44 may have software programmable I/O formats, part of the set up process is to determine what types of port interfaces (54 and 56) the I/O board 46 contains. There may be a unique ID 65 on the I/O board 46 that the software on the processing board 44 reads to determine what type of ports may be found on the I/O board 46. It should be noted that the secondary processing board 66 also reads the ID 65 of the primary I/O board 46 to determine the port interface type of the bearer traffic ports 54, along with the ID 73 of its own I/O board 68 for its own ports 71. Each processing board 44 and 66 also reads the IDs 65 and 73, respectively, to determine whether they are the primary or secondary board. Because the communication with the ports is software programmable, one tray 76 (processing board 44) can support all different types of docking stations 74 (I/O boards 46). For instance, if the I/O format is T1, the processing board 44 learns the format from the ID 65, and configures its software accordingly to interface with a T1 format. Also, because the port connections are programmable to further delineate each particular connection as a specific type of connection (e.g. the twenty-eight RJ-45 connections as a combination of T1/E1/J1 ports), the software may retrieve a user-created configuration file from a host computer (not shown) that designates the ports as such.

In accordance with another aspect of the present invention, each unique ID 64, 65, 72, and 73 may also be used for verification and licensing purposes. For verification, a host computer is programmed to recognize the unique ID of each telecom switch 42 and 60 and associated components that it controls. This ID can be used to prevent improper use of the switches (e.g. black market components). If the ID of a board does not match the host computer records, the board may be rendered inoperative by the host, and further administrative action may be taken. Also, in many situations clients purchase a license for a certain amount of ports. When the primary telecom switch 42 fails, the secondary switch 60 will need to know how many ports the client had licensed on the primary switch 42. This information can be stored on a host computer with reference to the unique IDs 64, 65, 72, and 73 of each component, and can be used by the secondary switch 60 accordingly to check for appropriate connection and to detect licensing violations.

Figure 3:
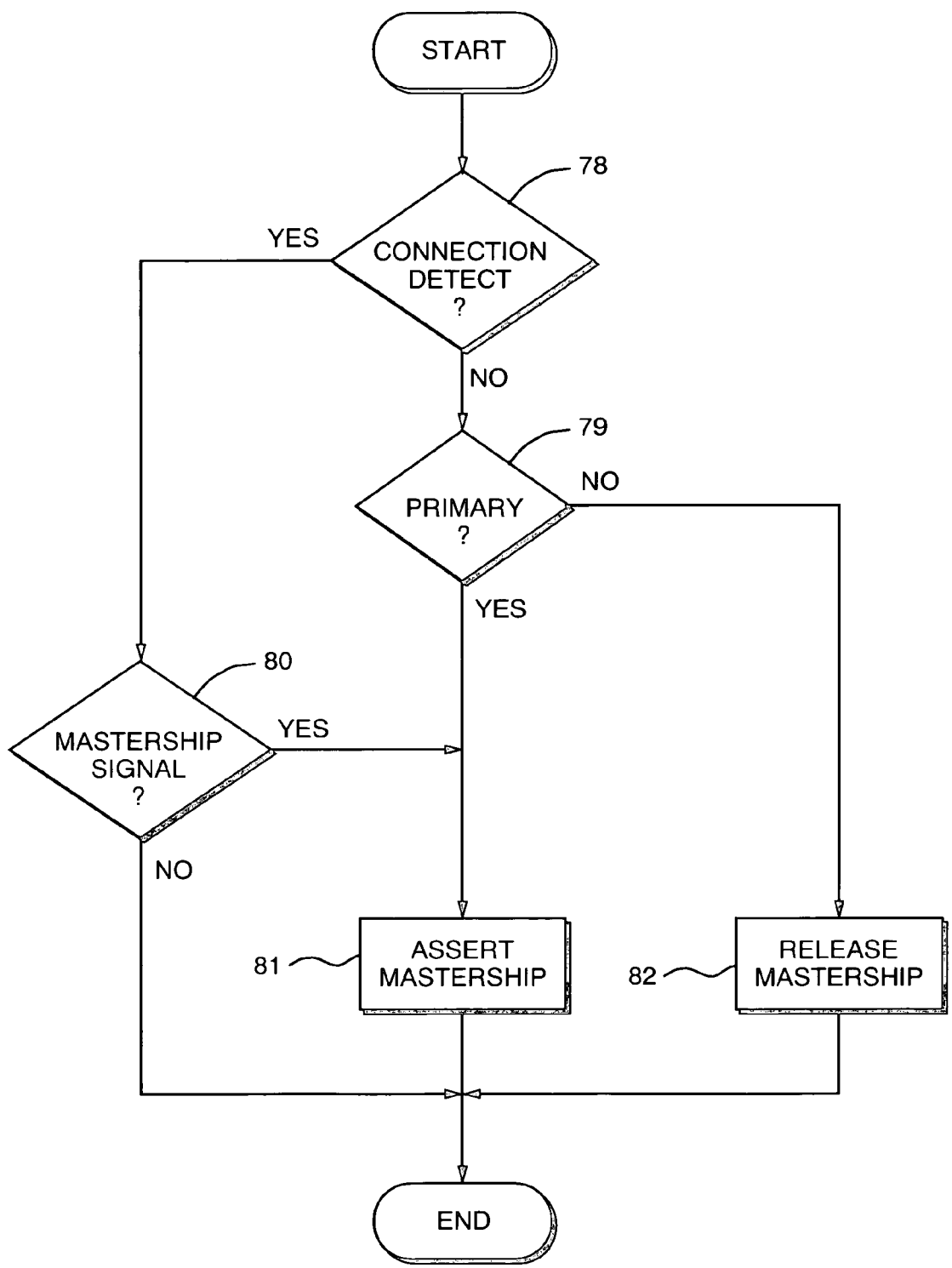
FIG. 3 is a flow chart showing a mastership control process in accordance with a preferred embodiment of the present invention.

Turning to FIG. 3, the mastership control process is described in accordance with a preferred embodiment of the present invention. Step 78 monitors the system for a connection detect signal from the redundancy connection 62. If the connection 62 is no longer available, the processing boards 44 and 66 act according to whether they are part of the primary switch 42 or secondary switch 60, determined at 79. The secondary board 66 must release mastership, step 82, in the event of a cable loss, as the board 66 is no longer communicating with the bearer traffic network 48. The primary board 44, on the other hand, must assert mastership at step 81 if it is not already the master, because as previously stated, the secondary board 66 is no longer in contact with bearer traffic network 48. If the redundancy connection 62 is available, and the connection detect signal is present at step 78, step 80 checks for a mastership signal from the connection 62. If a mastership signal is received, for example, at the secondary processing board 66, it indicates that the primary processing board 44 is no longer available, and that the board 66 must assert mastership, step 81, and vice versa. If a mastership signal is not received, mastership is not to be exchanged from the current master board.

Figure 4:
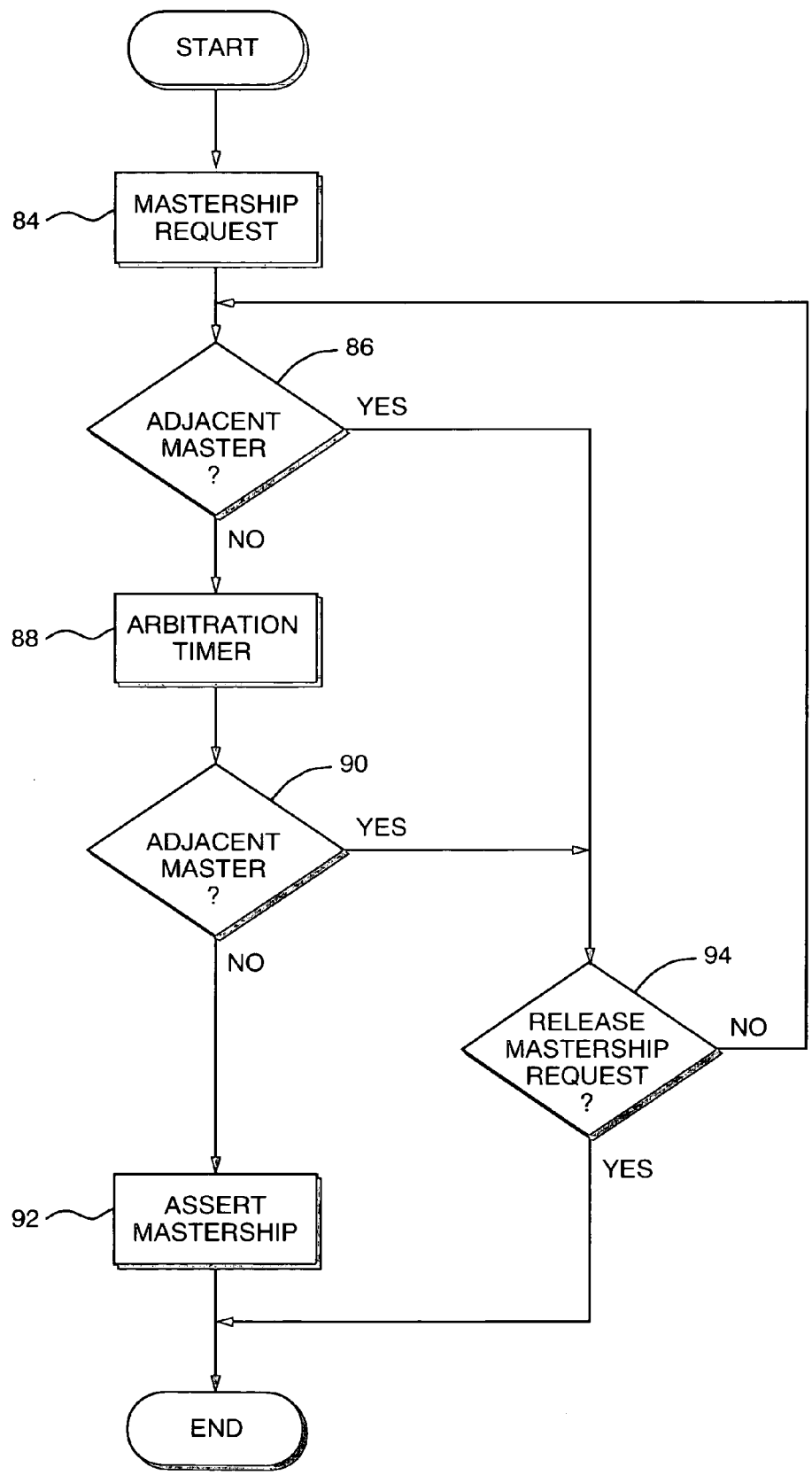
FIG. 4 is a flow chart showing a mastership request process in accordance with a preferred embodiment of the present invention.

The mastership request process in accordance with a preferred embodiment of the present invention will now be described with reference to FIG. 4. Each of the processing boards 44 and 66 can issue a request for mastership at step 84 as needed. Once this request is made, step 86 checks for any adjacent masters. If there is an adjacent board already claiming mastership, the requesting board enters a pending state until the mastership request is released, step 94, or until there is no longer an adjacent master at 86. If there are no other masters adjacent, step 88 begins an arbitration timer. The purpose for this timer is to protect against cases where multiple boards initiate a master request within a short period of time. It is preferred that the primary board 44 have a shorter arbitration timer than the secondary board 66, so that if both boards initiate a request, the primary board 44 will gain mastership when the timer expires (e.g. 20 us for the primary, and 40 us for the secondary). When the timer expires, step 90 checks once again to see if any adjacent boards are claiming mastership. If so, again, the requesting board enters a pending state until the mastership request is released, step 94, or until there is no longer an adjacent master at 86. If, however, there are no other adjacent masters at step 90, the board may assert mastership in step 92. It should be noted that the above-mentioned operations found in both FIG. 3 and FIG. 4 may be implemented as either software programming or hardware.

It should be understood that the present invention provides a unique simplified redundancy arrangement of a telecommunications switch that minimizes downtime and the risks associated with re-connections, yet provides complete redundancy.

The foregoing has been a detailed description of an illustrative embodiment of the invention. Various modifications and additions can be made without departing from the spirit and scope of the invention. Accordingly this description is meant to be taken only by way of example and not to otherwise limit the scope of the invention.

What is claimed is:

1. A system for providing redundancy for telecommunication switches (telecom switches) receiving control signal data from a control network and bearer traffic data from a bearer traffic network, said system comprising:

a primary telecom switch, said primary telecom switch having a primary I/O board for transmitting and receiving data, said primary I/O board having communicating relationships through: i) a control signal connection; ii) a bearer traffic connection; and iii) a primary redundancy connection, said primary telecom switch having a primary processing board for processing said data; and a secondary telecom switch, said secondary telecom switch having a secondary I/O board for transmitting and receiving data, said secondary I/O board having communicating relationships through: i) a control signal connection; and ii) a secondary redundancy connection in communicating relationship with said primary redundancy connection, said secondary telecom switch having a secondary processing board for processing said data, wherein said secondary telecom switch assumes the role of said primary telecom switch in the event that said primary processing board becomes unavailable, said secondary telecom switch communicating with said bearer traffic network through said primary and secondary redundancy connections and said primary I/O board instead of said secondary I/O board.

2. The system as in claim 1, wherein said telecom switches are converged services platforms (CSPs).

3. The system as in claim 1, wherein said bearer traffic network is a circuit-switched public switched telephone network (PSTN).

4. The system as in claim 1, wherein said bearer traffic network is a packet-switched Internet Protocol (IP) network.

5. The system as in claim 1, wherein said bearer traffic connection is a port type selected from the group consisting of: T1, E1, J1, and DS3.

6. The system as in claim 1, further comprising: a memory storing programming to delineate port types of said bearer traffic connection.

7. The system as in claim 1, wherein said primary and secondary redundancy connections communicate via one or more cables.

8. The system as in claim 7, wherein said one or more cables are keyed to prevent improper engagement.

9. The system as in claim 7, further comprising: a connection detect signal provided on said one or more cables, which indicates the availability of connection between said primary and secondary telecom switches.

10. The system as in claim 9, wherein said primary telecom switch asserts mastership in the event of an interruption of said connection detect signal indicating an unavailable connection.

11. The system as in claim 9, wherein said secondary telecom switch releases mastership in the event of an interruption of said connection detect signal indicating an unavailable connection.

12. The system as in claim 9, wherein said connection detect signal is provided on substantially all of said one or more cables.

13. The system as in claim 1, wherein said secondary telecom switch receives bearer traffic data regardless of whether said primary telecom switch is available or unavailable.

14. The system as in claim 1, further comprising: unique identifications (IDs) on each of said primary and secondary processing and I/O boards.

15. The system as in claim 14, wherein said IDs are used for system configuration.

16. The system as in claim 14, wherein said IDs are used for product verification.

17. The system as in claim 14, wherein said IDs are used for licensing purposes.

18. The system as in claim 1, further comprising: a mastership signal communicated between said primary and secondary telecom switches.

19. The system as in claim 18, wherein said secondary telecom switch asserts mastership in the event that said mastership signal indicates that said primary telecom switch is unavailable.

20. The system as in claim 1, wherein each of said primary and secondary telecom switches is configured to issue a request for mastership, check for adjacent masters, and, if a master is found, enter a pending state until releasing said request, and if a master is not found, assert mastership.

21. The system as in claim 20, wherein each of said primary or secondary telecom switches includes an arbitration timer which must expire before the associated switch asserts mastership.

22. The system as in claim 21, wherein said primary telecom switch has an arbitration timer that is set at less time than an arbitration timer of said secondary telecom switch.

23. A method for providing redundancy for telecommunication switches (telecom switches) said method comprising the steps of:
communicating, at a primary and secondary telecom switch, control signal data with a control network over primary and secondary control signal connections on a primary and secondary I/O board, respectively;
communicating, at said primary telecom switch, bearer traffic data with a bearer traffic network over primary bearer traffic connections on said primary I/O board;
communicating, at said secondary telecom switch, bearer traffic data with said bearer traffic network over a secondary redundancy connection on said secondary I/O board in communicating relationship with a primary redundancy connection on said primary I/O board;
processing said control signal data and said bearer traffic data on a primary and secondary processing board on said primary and secondary telecom switches, respectively; and
in the event that said primary processing board becomes unavailable, assuming, at said secondary telecom switch, the role of said primary telecom switch, said secondary telecom switch communicating with said bearer traffic network through said primary and secondary redundancy connections and said primary I/O board instead of said secondary I/O board.

24. The method as in claim 23, wherein said telecom switches are converged services platforms (CSPs).

25. The method as in claim 23, wherein said bearer traffic network is a circuit-switched public switched telephone network (PSTN).

26. The method as in claim 23, wherein said bearer traffic network is a packet-switched Internet Protocol (IP) network.

27. The method as in claim 23, wherein said bearer traffic connection is a port type selected from the group consisting of: T1, E1, J1, and DS3.

28. The method as in claim 23, further comprising the step of: delineating port types of said bearer traffic connection with programming stored on a memory.

29. The method as in claim 23, wherein said communicating at said second telecom switch occurs over one or more cables.

30. The method as in claim 29, including the step of keying said one or more cables to prevent improper engagement.

31. The method as in claim 29, further comprising the step of: communicating a connection detect signal over said one or more cables, which indicates the availability of connection between said primary and secondary telecom switches.

32. The method as in claim 31, further comprising the step of: asserting mastership at said primary telecom switch in the event of an interruption of said connection detect signal indicating an unavailable connection.

33. The method as in claim 31, further comprising the step of: releasing mastership at said secondary telecom switch in the event of an interruption of said connection detect signal indicating an unavailable connection.

34. The method as in claim 31, wherein said connection detect signal is communicated over substantially all of said one or more cables.

35. The method as in claim 23, further comprising the step of: receiving bearer traffic data at said secondary telecom switch regardless of whether said primary telecom switch is available or unavailable.

36. The method as in claim 23, further comprising the step of: providing unique identifications (IDs) on each of said primary and secondary processing and I/O boards.

37. The method as in claim 36, further comprising the step of: using said IDs for system configuration.

38. The method as in claim 36, further comprising the step of: using said IDs for product verification.

39. The method as in claim 36, further comprising the step of: using said IDs for licensing purposes.

40. The method as in claim 23, further comprising the step of: communicating a mastership signal between said primary and secondary telecom switches.

41. The method as in claim 40, further comprising the step of: asserting mastership at said secondary telecom switch in the event that said mastership signal indicates that said primary telecom switch is unavailable.

42. The method as in claim 23, further comprising the steps of:
issuing a request for mastership;
checking for adjacent masters; and
if a master is found, entering a pending state until releasing said request, and if no master is found, asserting mastership.

43. The method as in claim 42, further comprising the step of: waiting for an arbitration timer to expire prior to asserting mastership.

44. The method as in claim 43, wherein said primary telecom switch has an arbitration timer that is less time than an arbitration timer of said secondary telecom switch.

45. A system for providing redundancy for telecommunication switches (telecom switches) receiving control signal data from a control network and bearer traffic data from a bearer traffic network, said system comprising:
means for communicating, at a primary and secondary telecom switch, control signal data with a control network over primary and secondary control signal connections on a primary and secondary I/O board, respectively;
means for communicating, at said primary telecom switch, bearer traffic data with a bearer traffic network over primary bearer traffic connections on said primary I/O board;
means for communicating, at said secondary telecom switch, bearer traffic data with said bearer traffic network over a secondary redundancy connection on said secondary I/O board in communicating relationship with a primary redundancy connection on said primary I/O board;

means for processing said control signal data and said bearer traffic data on a primary and secondary processing board on said primary and secondary telecom switches, respectively; and in the event that said primary processing board becomes unavailable, means for assuming, at said secondary telecom switch, the role of said primary telecom switch, said secondary telecom switch communicating with said bearer traffic network through said primary and secondary redundancy connections and said primary I/O board instead of said secondary I/O board.

* * * * *